Jan. 23, 1940.          W. F. ALLER ET AL          2,187,961
                           MACHINE TOOL
                        Filed Jan. 15, 1938           5 Sheets-Sheet 3

INVENTOR
Willis Fay Aller
BY Harry L. Rausch
Marechal & Noe
ATTORNEY

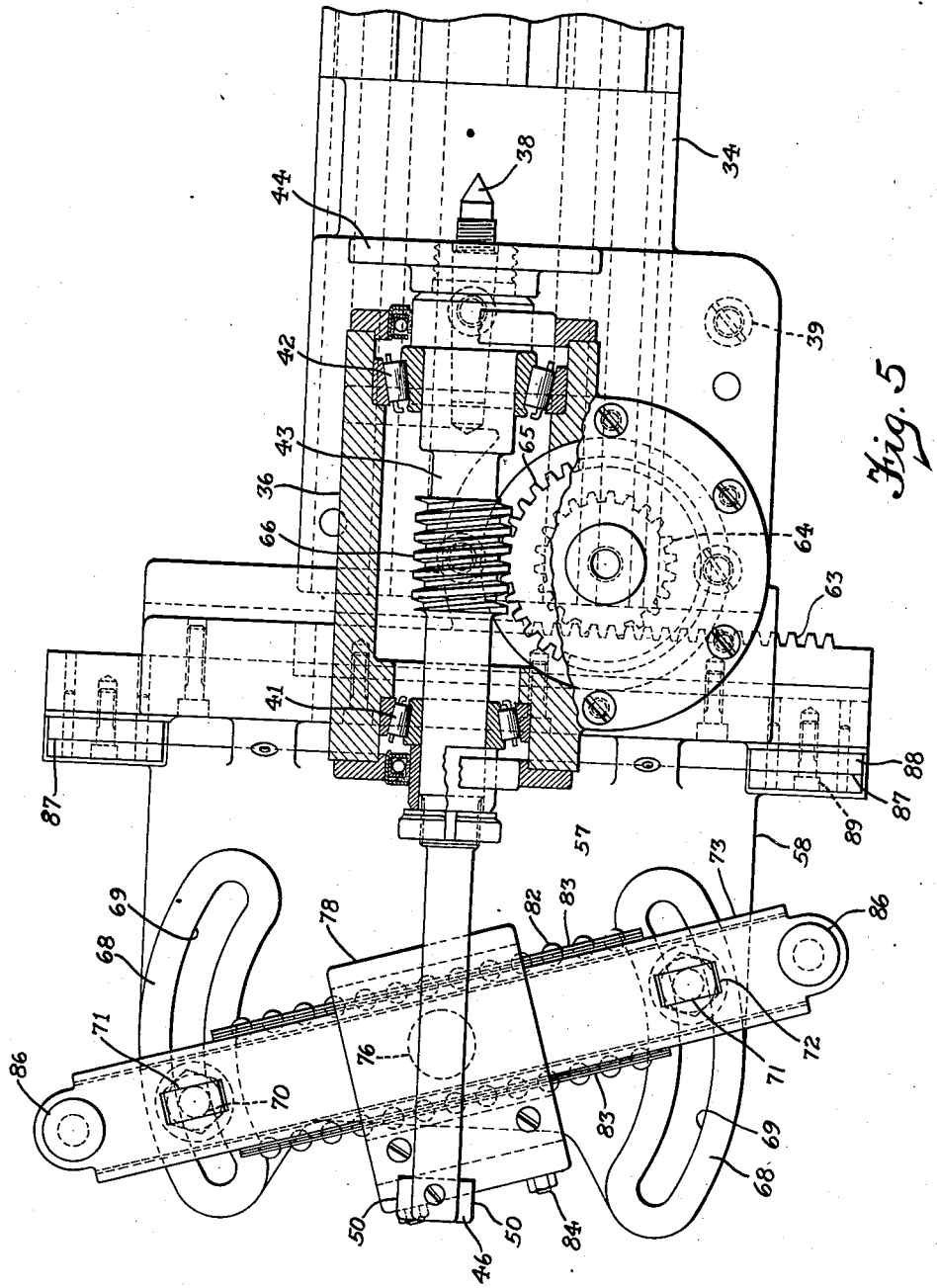

Jan. 23, 1940.　　　W. F. ALLER ET AL　　　2,187,961
MACHINE TOOL
Filed Jan. 15, 1938　　　5 Sheets-Sheet 5
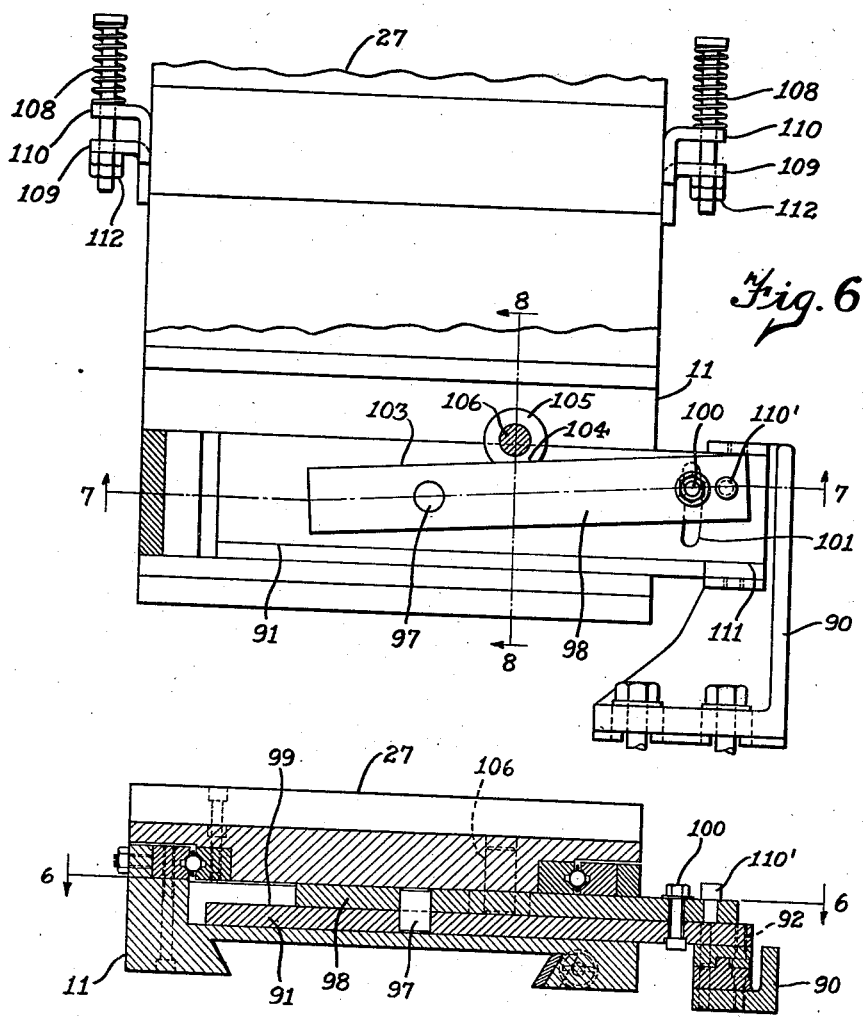
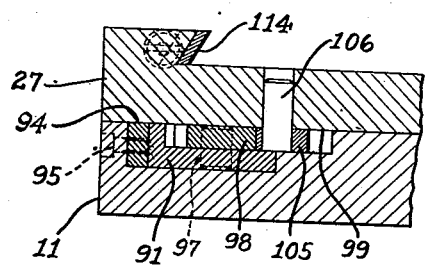
INVENTOR
Willis Fay Aller
BY Harry L. Rausch
Maréchal & Noe
ATTORNEY Patented Jan. 23, 1940

2,187,961

UNITED STATES PATENT OFFICE 2,187,961

MACHINE TOOL

Willis Fay Aller and Harry L. Rausch, Dayton, Ohio, assignors to The Sheffield Gage Corporation, Dayton, Ohio, a corporation of Ohio Application January 15, 1938, Serial No. 185,171

12 Claims. (Cl. 51—95)

This invention relates to machines for cutting threads and the like on work pieces.

One object of the invention is the provision of a machine for accurately producing threads and the like on work pieces and having readily adjustable mechanism for accurately determining the thread lead so arranged as to move the work axially at a rate controlled with respect to the work rotation while the work is engaged by a thread grinding wheel or the like.

Another object of the invention is the provision of a machine for accurately producing threads and the like on work pieces and including a work supporting slide movable endwise by a carriage mounted on the slide and carrying a bar which may be accurately positioned on the carriage to determine the rate of slide movement while the work is engaged by a thread cutting means.

Another object of the invention is the provision of a machine of the character mentioned in which the adjusting mechanism for determining the thread lead includes an adjustable angle bar having gaging members at opposite ends which are adapted for cooperation with gaging surfaces laterally spaced from the gaging members for accurately determining the angular setting of the bar by lineal measurements.

Another object is the provision of a machine of the character mentioned in which the thread cutter is moved toward or away from the work at a controlled rate while the thread is cut on the work so that a taper thread is produced.

Other objects and advantages of the invention will be apparent from the following description, the appended claims and the accompanying drawings, in which Fig. 1 is a top plan view of a machine embodying the present invention;

Fig. 5 is a top plan view of the head stock and the angle bar carriage by which it is moved;

Fig. 6 is a top plan view of the cutter supporting and adjusting mechanism, shown partly in section on the line 6—6 of Fig. 7;

Fig. 7 is a section on the line 7—7 of Fig. 6; and

Fig. 8 is a section on the line 8—8 of Fig. 6.

Figure 1:
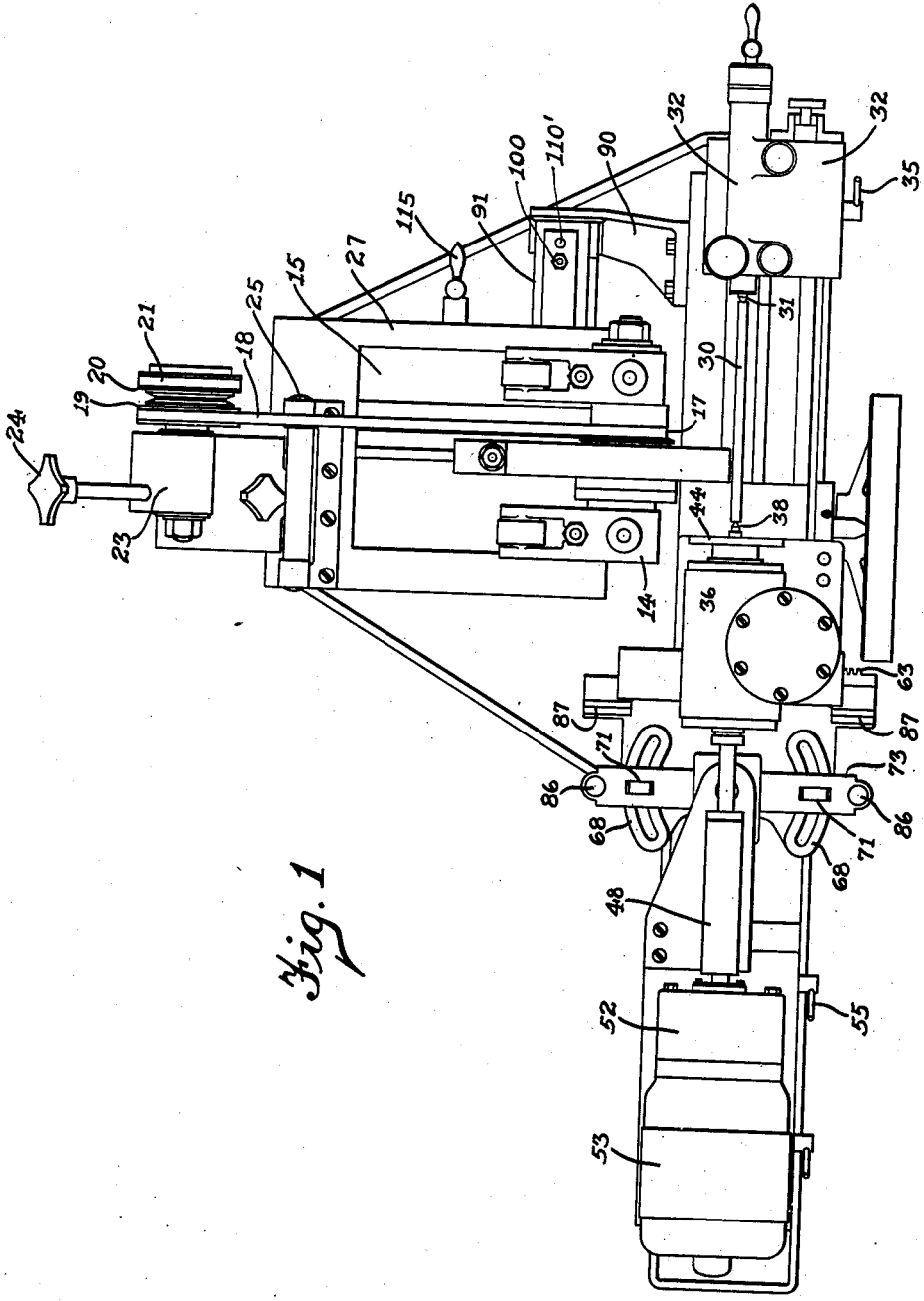

Referring more particularly to the drawings by reference numerals, the machine, which is operable to accurately produce threads and the like with any desired lead on work pieces, comprises a main supporting frame 10 the rear portion of which provides a table 11 on which the cutter supporting structure 12 is arranged. The cutter as herein shown is a rotatable grinding wheel 13, suitably journalled for rotational movements in bearing members which form a part of a structure 14 which is adjustably mounted on accurate surfaces 16 provided on the cutter supporting slide 15. Suitably fixed to the grinding wheel shaft is a pulley wheel 17 operated by a belt 18 which is driven by pulley wheel 19. The latter is connected to an adjacent pulley wheel 20. A drive belt 21, operated from a suitable power source, extends around the pulley wheel 20. The pulley wheels 19 and 20 are carried on an adjustable bracket 23 which is supported by means of an adjusting screw 24 having a pivotal connection at 25 to a table slide 27 on which the cutter slide 15 is supported. By turning the screw 24 the tension of the belt 18 may be adjusted. The table slide 27 is supported for sliding movement on the table 11 as will be presently described so that the grinding wheel can be moved towards and away from the work, but this movement of the table slide 27 can take place without changing the tension of the belt 18 in view of the manner in which the pulley wheels 19 and 20 are supported as above mentioned.

The grinding wheel 13 is suitably shaped to cut a thread or other helical groove in a bar or work piece 30 which is supported for rotation on its own center and which is adapted to be moved endwise in timed relation to its rotational movements so that a thread of the precise lead desired will be produced. One end of the work is mounted on a cone or fixed center 31 which is adjustably supported in any usual manner on a tail stock 32 which is slidably carried on suitable guideways 33 in a slide 34, the tail stock being movable in the direction of the work axis to accommodate work pieces of different length and being held securely on the slide 34 in any adjusted position by means of a locking handle 35 of any usual character.

Figure 4:
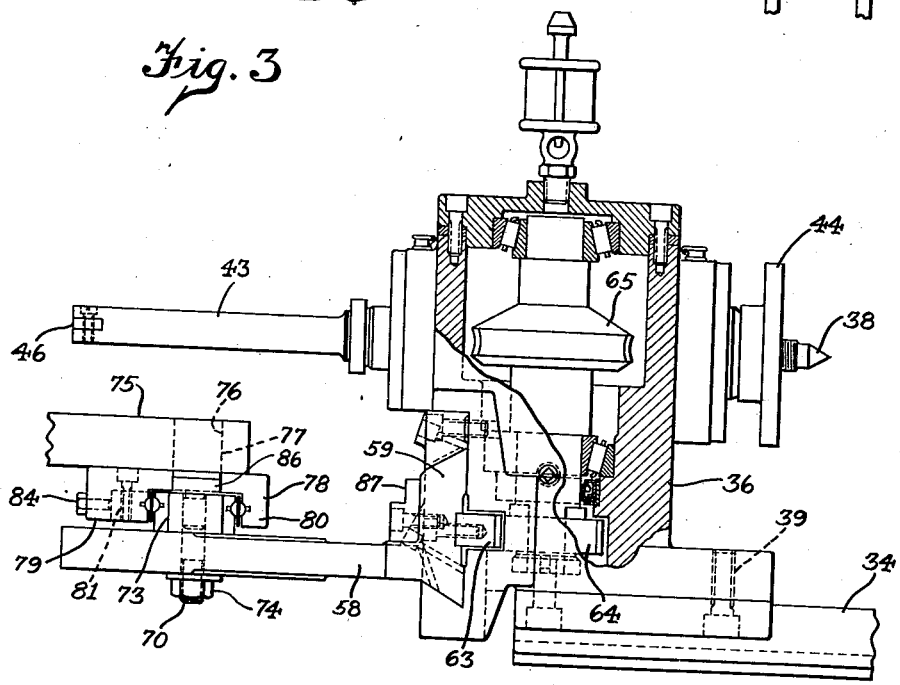
Fig. 4 is a side elevation of the work supporting head stock, shown partly in vertical section.

The slide 34 also supports a head stock 36, see Fig. 4, which is provided with a live center or cone 38 adapted for engagement with a countersunk hole in the end of the work piece. The head stock is mounted in fixed position on the slide 34 by means of holding bolts 39.

The head stock 36 is provided with antifriction bearings 41 and 42 which rotatably support the driven shaft 43. The live center or cone 38 is suitably fixed on the end of this shaft 43, and adjacent the cone 38 is a driving disk 44 which may be connected to the work piece by any suitable form of driving dog to produce rotational movements of the work piece in accordance with the rotation of the shaft 43. At the other end of the shaft 43 is a coupling member 46 of non-circular cross-section engageable with and driven by a motor operated sleeve or drive member 48. The latter is provided with opposed slots 49 slidably receiving the extended lips 50 of the connection 46 so that the end of the shaft 43 is telescopically arranged in the sleeve 48, but the two members must rotate together.

The sleeve member 48 is fixed to and rotated by shaft 51 of a suitable gear reducing unit 52, the latter being operated from an electric motor 53 which is mounted on a motor carrying slide 54, supported in turn on the base or frame 10 of the machine. The motor carrying slide 54 is movable in the direction of the axis of the shaft 43 and is locked to the frame 10 in any desired position by means of suitable locking handles 55.

Figure 2:
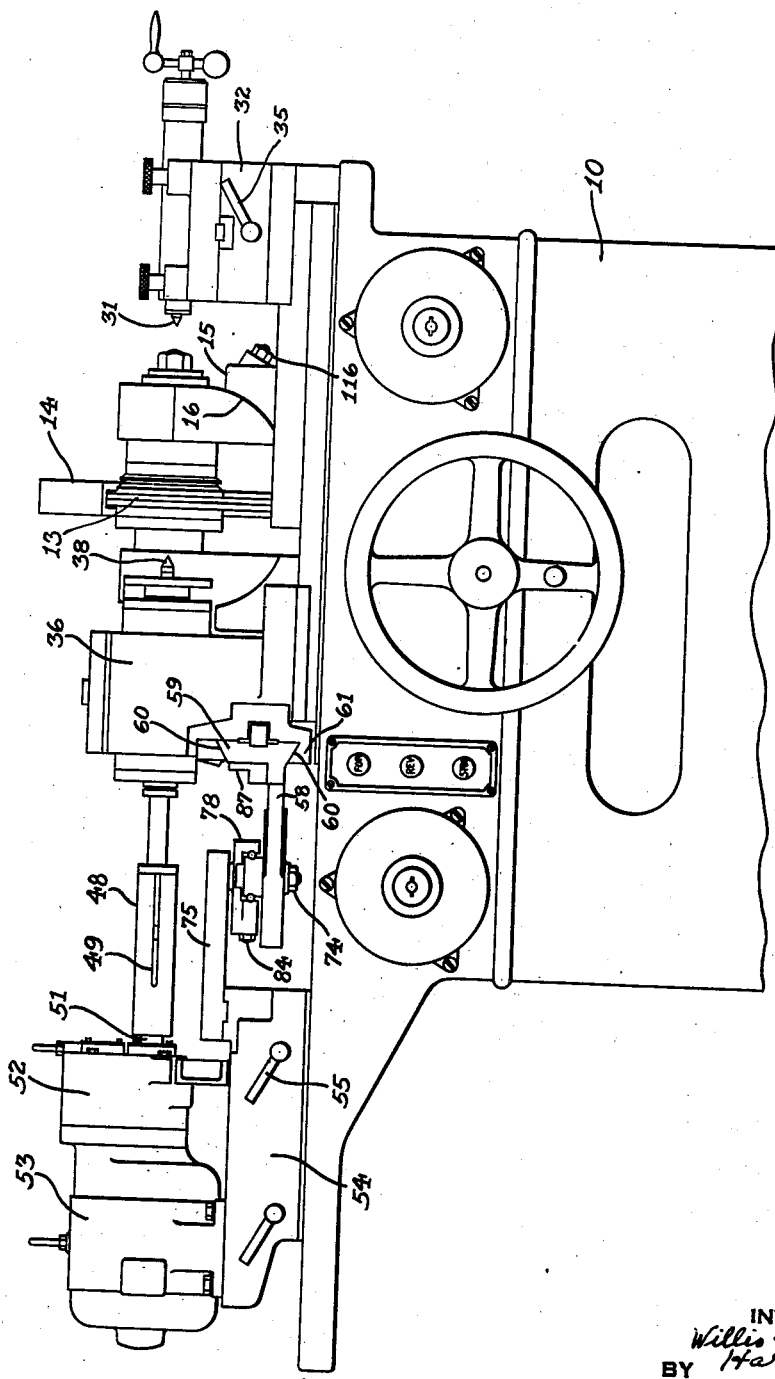
Fig. 2 is a front elevation of the machine, the bottom part of the base being omitted.

To determine the lead of the thread cut on the work piece 30 a mechanism is provided which is capable of adjustment and which may accurately determine various thread leads as desired without requiring the replacement of standard lead controlling screws in the machine. This mechanism produces a timed movement of the work in the direction of the work axis, the speed of movement being correlated with the speed of rotation by means of an angularly adjustable bar which can be set at different angles to produce different lead speeds. This mechanism, as shown in Fig. 5, comprises a carriage 57 having a horizontally extending wall 58 and having an end wall 59 shown in Figs. 2 and 4 extending vertically at one end of the wall 58 and providing guide surfaces 60 which are slidably supported in guideways 61 on the head stock 36. The bar carrying carriage 57 is thus adapted to move towards and away from the front of the machine, or in other words transversely to the axis of the work. This movement of the carriage 57 is produced by means of rack teeth 63 provided on the guided wall portion 59 of the carriage and meshing with a spur gear 64 which is fixed to a larger gear 65 shown as a worm wheel, which meshes with a worm 66 provided on the shaft 43. The teeth of the worm, rack, and gears are accurately cut so that back lash is substantially eliminated, and the transverse movements of the bar carriage 57 are thus exactly proportionate to the angular rotation of the shaft 43.

On the carriage 57 are bar supporting surfaces 68 and arcuate slots 69 which receive locking studs 70. The upper portions of the locking studs are rectangular heads 71 which fit snugly at their sides in slots 72 provided in the angle bar 73 which rests on the surfaces 68, and which may be moved angularly about a vertical axis to assume different angles with respect to the axis of the work. Some slight endwise movement of the bar 73 may take place when the locking studs are loosened because the length of the slots 72 is preferably slightly greater than the length of the heads 71 of the studs. The positioning of the angle bar 73 is maintained by tightening up the nuts 74 on the studs 70 to maintain any desired angularity of the bar with respect to the carriage 57.

Fixed to the motor slide 54 and extending toward the head stock is rigid arm 75 having a cylindrical hole 76, see Fig. 4. In the hole 76 is rotatably mounted a stud 77 formed as a part of a block 78, having downwardly extending side portions 79 and 80 that extend along opposite sides of the bar 73. The upper side of the block 78 bears against the lower side of the arm 75 between the downwardly extending portions 79 and 80 of the block 78 and the sides of the bar 73 are a number of balls 82 rotatably supported in spaced relation with respect to one another by retaining cages 83 and operable in V grooves in the sides of the bar and in the block. One of the V grooves in the block is provided in an adjustable member 81 which may be moved horizontally towards the opposite end of the block to take up wear and eliminate lost motion between the sides of the bar and the block, the member 81 being positioned by means of locating studs 84 which are threaded in the block 78 as shown in Fig. 4. It will now be apparent that the pivot block 78 is rotatably mounted about its own vertical axis, which is arranged in line with the axis of the shaft 43, so that as the bar 73 moves horizontally in a direction transverse of the work axis, it will be moved horizontally in the direction of the work axis at a proportionate rate depending on the angularity of the bar 73. As the bar carriage 57 is mounted on the head stock it will move the slide 34, the head stock and the tail stock in an endwise direction and produce corresponding movement of the work itself. When the bar 37 is in the position shown in Fig. 1 no endwise movement of the slide 34 is produced, but by moving the bar 73 either clockwise or counterclockwise from that position a movement of the work in the direction of the work axis is obtained in one direction or the other depending on whether a right-hand thread or a left-hand thread is desired.

In order to accurately determine the angular setting of the bar 73, each end of the bar is provided with an upwardly extending round post 86, the two posts 86 being arranged at equal distances from the centers of the slots 69 in the bar carriage. On the carriage and horizontally spaced from the posts 86 are vertical transversely extending gage surfaces 87 provided on blocks 88 which are fixed by screws 89 to the wall portion 59 of the bar carriage. The operator, to determine the angular setting desired for the bar 73, computes the angularity of the bar to give a desired lead movement to the work, and then positions the bar by measuring the distance between a post 86 and a gage surface 87 at one side of the work axis by inserting a gage member of known size between these parts. The position of the other end of the bar is similarly determined by inserting a gage block of known size and of the required dimension between the other post 86 and the other gage surface 87, and with the bar 73 properly located on the bar carriage he then tightens the fastening bolts 74 so that the bar will be held in the desired angular relationship. The distance between the gage surfaces 87 and the gage posts 86 may thus be gaged with extreme accuracy so that the lead movement imparted to the work may be very accurately determined. As the sides of the bar 73 are perfectly straight the lead imparted to the thread cut on the work piece will be perfectly uniform from one end of the thread to the other.

Where the thread produced on the work piece is made by a rotatable grinding wheel as above described the grinding wheel does not move bodily since the relative movement between the work and the grinding wheel is accomplished by moving the work itself in the direction of the work axis, this movement of the work being effected accurately by the angle bar and its supporting carriage as previously described, and the endwise movement of the work is accomplished smoothly as vibrational tendencies imparted by the motor which operates the grinding wheel are not transmitted to the work moving mechanism which determines the thread lead. As the grinding wheel remains in a definite position while cutting a thread, it may be driven by a simple arrangement including a flexible belt so that the grinding wheel, although operating at high speed, does not receive vibrational movements of the motor which operates it.

Figure 3:
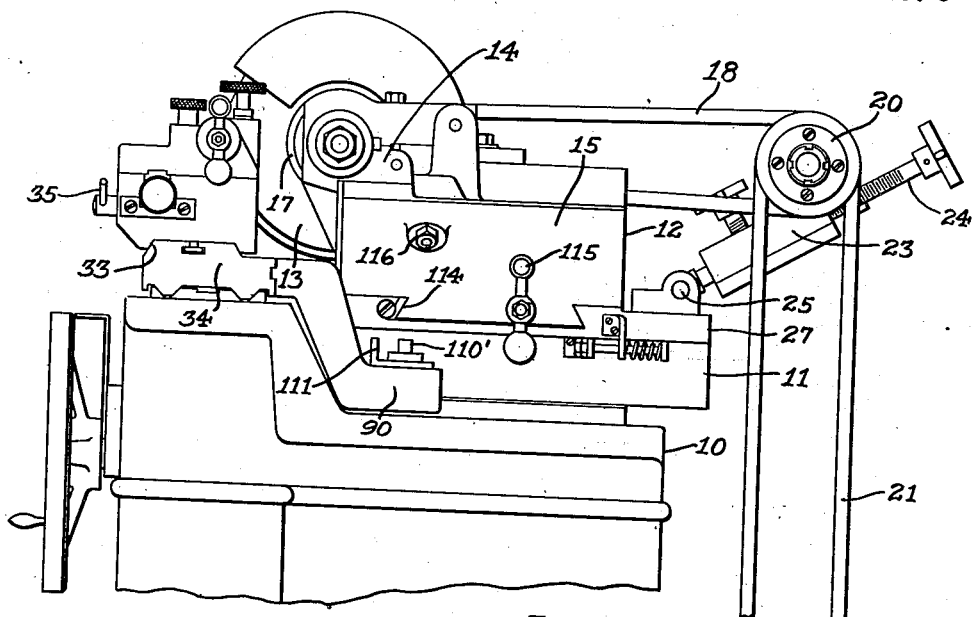
Fig. 3 is a side elevation of the machine, with the bottom part of the base omitted.

When cutting a straight thread, without taper, the grinding wheel does not move toward or away from the work during a cutting operation, but to permit the use of the same grinding wheel without changing its contour, in the production of a tapered thread, mechanism is provided for moving the grinding wheel slowly towards or away from the work axis during the cutting operation and at a speed coordinated with the endwise movement of the work itself. This mechanism for moving the grinding wheel support is shown in Figs 6, 7 and 8 and includes an angularly adjustable bar the angularity of which determines the movement of the grinding wheel transversely to the axis of rotation of the work. Referring more particularly to Figs. 1, 3 and 7 it will be noted that the slide 34 which is operated endwise in accordance with the angular setting of the bar 73, carries a rearwardly and downwardly extending arm 90 to which a transversely extending L-shaped slide bar 91 is secured as by means of suitable fastening bolts 92. The slide bar 91 extends parallel to the work axis and projects into the table 11 in which it is slidably supported for endwise movement by means of a suitable guide 94 which is adjustably mounted in the table 11 by means of a wear adjusting locating screw 95. When there is an endwise movement of the work, which is concentrically rotated about its own axis, there is a corresponding and equal endwise movement of the slide bar 91 within the table 11.

Pivotally connected to the slide bar 91 by means of a vertical pivot stud 97 is an angle bar 98 which rests on the upper surface 99 of the slide bar and which may extend parallel to the slide bar in the position shown in Fig. 1 when a straight thread is to be produced. To produce a thread with a taper, the angle bar 98 may be moved on the pivot stud 97 to a position as shown for example in Fig. 6, in which it is fixed by tightening a bolt 100 which extends through a circular hole in the outer portion of the angle bar 98 and through a slot 101 in the slide bar 91. The operating surface 103 of the angle bar 98 bears against the flat side 104 of a pressure member 105 which is fixed to and carried by a pivot pin 106 rotatably supported on a vertical axis in the table slide 27. The flat side 104 of the pressure member may arrange itself so as to be parallel to and against the operating surface 103 of the angle bar in accordance with the angular position of the latter, and is held against the latter under adjustable tension as by means of springs 108 which are provided at opposite sides of the table 11 and which engages brackets 109 fixed to table 11 and arms 110 fixed to the table slide 27. The tension of the springs may be adjusted by means of nuts 112 in accordance with the diameter of the work piece. These springs 108 maintain the pressure member 105 in engagement with the angle bar 98, and it will now be apparent that when the angle bar moves in the direction of the length of the slide bar 91, towards the right for example as shown in Fig. 6, the table slide 27 will be moved to advance the grinding wheel towards the work at a comparatively slow rate in accordance with the angular setting of the angle bar 98. The movement of the cutting tool towards the work is exactly timed and proportionate to the endwise movement of the work so that the work will be given a thread having uniform taper from one end of the taper portion to another; and the threads will have the proper shape as the work rotates about its own axis while the grinding wheel has a fixed plane of rotation. The taper on the threads may be produced in either direction as desired, as the angle bar 98 may be moved at its outer end either toward or from the work.

It will be understood that the axis of rotation of the grinding wheel is maintained in the same horizontal plane as the axis of the work piece, in cutting either straight threads or tapered threads. However the plane of rotation of the grinding wheel is slightly inclined with respect to the vertical in order that the path described by the cutting surface will correspond to the helix angle of the thread. This slight inclination of the plane of rotation is obtained by adjusting the structure 14 on the cylindrically curved seat surface 16 of the cutter supporting slide 15 (see Fig. 1), the adjusted position being maintained by means of lock bolts 116 which, when tightened, securely locate the structure 14 on slide 15.

Projecting upwardly from the outer end of the angle bar 98 is a round post 110', and a flat gaging surface 111 is provided on the side of the slide bar 91 at the outer end thereof, as shown in Fig. 6, so that the lineal distance between the post 110' and the gaging surface 111 may be very accurately determined by inserting a gaging block, of known size between these parts, different gage blocks of different predetermined sizes being employed to produce any desired thread taper. Since the post 110' is cylindrical in form, the distance between the side of the post and the gage surface 111 gives an exact determination of the distance between the center of the post 110' and the gage surface by adding the known radius of the post.

Referring again to Fig. 3, it will be seen that when a taper thread is produced on the work by the mechanism previously described, the grinding wheel will move slowly to the left or to the right as illustrated in that figure, and since the pulley wheels 19 and 20 move correspondingly, being mounted on the bracket 23 which is fixed to the moving table slide 27, the belt 18 will remain taut, and the horizontal movement of the pulleys 19 and 20 will not substantially change the tautness of the driving belt 21 as the latter extends substantially vertically from the pulley 20. To initially position the grinding wheel in the direction of the work axis to a desired starting point with respect to the work, the cutter supporting slide 15 may be moved along the guideways 114, provided on the table slide 27, by means of an operating hand lever 115, the latter remaining stationary, however, during cutting operations.

As will now be quite apparent, in cutting a thread on a work piece the rotation of the work, carried by the live spindle on the shaft 43, is synchronized with the transverse movements of the carriage 57, see Fig. 5, by means of the worm 66, gears 65 and 64 and the rack 63. With the bar 73 adjusted and fixed at a suitable angle for the desired thread lead, the transverse movements of the carriage produce movement of the bar 73 in the block 78 which is held against bodily movement and therefore moves the carriage 57 in a direction parallel to the work axis. This moves the head stock, the work and the tail stock endwise while the rotatable grinding wheel is cutting the work and accurately producing the thread. For taper threads the angle bar 98, see Fig. 6, is set at the proper angle with respect to the slide bar 91 so that as the angle bar 98 moves with the work and parallel to the work axis, it will give the desired movement of the grinder towards or away from the work at a constant speed of movement throughout the length of the taper thread to be produced.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A thread cutting machine of the character described comprising a slide having a work supporting member, a support on which said slide is guided for straight-line movement, drive means for rotating the work piece, a carriage slidably mounted on said slide for movement in a direction transverse to the straight-line direction of slide movement, gearing connected to said drive means for operating said carriage on said slide, a straight-sided bar adjustably mounted on said carriage for fixed positioning at various angles to the direction of carriage movement on the slide, means producing movement of the carriage in the straight-line direction of slide movement by movement of the carriage on the slide for corresponding movement of the slide in accordance with the setting of the bar and comprising a part slidably connected to a straight side of said bar and having a fixed center located on said support, and a cutting tool arranged adjacent said work piece.

2. A thread cutting machine of the character described comprising a work carrying slide for rotatably supporting a work piece, a support on which said slide is guided for straight-line movement, drive means for rotating the work piece, a carriage slidably mounted on said slide for movement in a direction transverse to the straight-line direction of slide movement, an angle member adjustably mounted on said carriage for positioning at various angles to the direction of carriage movement on the slide, said angle member having straight parallel sides, means slidably connected to the parallel sides of said angle member and having a fixed center located on said support whereby movement of the carriage on the slide produces movement of the carriage in the straight-line direction of slide movement in accordance with the angle setting of the angle member, and a rotatable grinding wheel having a fixed plane of rotation during a cutting operation.

3. In a thread cutting machine of the character described, a head stock and a tail stock for rotatably supporting a work piece, a slide supporting said head stock and tail stock, a support on which said slide is guided for endwise movement, drive means for rotating the work piece, a carriage slidably mounted on said slide for movement in a direction transverse to the endwise direction of slide movement, gearing having connection to said drive means for operating said carriage on said slide, a bar adjustably mounted on said carriage for positioning at various angles to the direction of carriage movement on the slide, means slidably connected to said bar and having a fixed center located on said support whereby movement of the carriage on the slide produces movement of the carriage in the endwise direction of slide movement in accordance with the angle setting of the bar, gage receiving abutment members at opposite ends of said bar having circular gage surfaces, and cooperating gage surfaces on said carriage adjacent said gage receiving abutment members for accurately gaging the angular setting of the bar, and a cutting tool arranged adjacent the work piece.

4. In a thread cutting machine of the character described, a head stock and a tail stock for rotatably supporting a work piece, a slide supporting said head stock and tail stock, a support on which said slide is guided for endwise movement, drive means for rotating the work piece, a carriage slidably mounted on said slide for movement in a direction transverse to the endwise direction of slide movement, gearing supported in said head stock and operated by said drive means for operating said carriage on said slide, a bar adjustably mounted on said carriage for positioning at various angles to the direction of carriage movement on the slide, means for locking opposite ends of said bar to said carriage, abutment means on opposite ends of said bar for gaging with respect to a plane transverse of the direction of work movement, means slidably connected to said bar and pivotally supported for movement about a fixed axis whereby movement of the carriage on the slide produces movement of the carriage in the endwise direction of slide movement in accordance with the angle setting of the bar, and a grinding wheel arranged adjacent the work piece and engagable therewith.

5. In a thread cutting machine of the character described, a head stock and a tail stock for rotatably supporting a work piece, a slide supporting said head stock and tail stock, a support on which said slide is guided for straight-line movement, drive means for rotating the work piece, a carriage slidably mounted on said slide for movement in a direction transverse to the straight-line direction of slide movement, said carriage and slide having cooperating portions preventing relative movement in said straight-line direction, gearing having connection to said drive means for operating said carriage on said slide, a bar adjustably mounted on said carriage for positioning at various angles to the direction of carriage movement on the slide said bar having side parallel opposed grooves, balls rotatably mounted in said grooves, a pivot block having opposed grooves receiving said balls to provide a slidable connection between the bar and the pivot block said block having a pivot mounting on said support whereby movement of the carriage on the slide produces movement of the carriage in the straight-line direction of slide movement in accordance with the angle setting of the bar, and a cutting tool arranged adjacent the work piece in engagement therewith.

6. In a thread cutting machine of the character described, a head stock and a tail stock for rotatably supporting a work piece, a slide supporting said head stock and tail stock, a support on which said slide is guided for endwise movement, drive means for rotating the work piece, a carriage slidably mounted on said head stock for movement in a direction transversely of the endwise direction of the head stock and slide, said carriage having a horizontally extending portion and a vertically extending end portion with the latter guided in the head stock, a rack on said vertically extending portion, gearing in said head stock having connection to said drive means for operating said rack to move the carriage on the head stock, a bar adjustably mounted on horizontally extending portion of said carriage for positioning at various angles to the direction of carriage movement on the head stock, means slidably connected to said bar and having a fixed center located on said support for moving the carriage in the endwise direction of slide movement in accordance with the angle setting of the bar, and a cutting tool arranged adjacent the work piece for engagement therewith.

7. In a thread cutting machine of the character described, work supporting means, means for rotating the work, a grinding wheel, a grinding wheel support, moving means for moving the work in an axial direction with respect to the grinding wheel and comprising an angularly adjustable straight-sided bar operably connected to the work supporting means and means for bodily moving said bar at an angle to the work axis to move the work in the direction of the work axis, and mechanism for moving the grinding wheel support toward the work axis while the grinding wheel produces a thread on the work, said mechanism including an angle bar operable to different positions of adjustment determining the rate of movement of the grinding wheel towards the work, and means for bodily moving said angle bar in accordance with the axial movement of the work respecting the grinding wheel.

8. A thread cutting machine of the character described comprising a frame, work supporting means slidably mounted on said frame, means for rotating the work, a cutter, a cutter support mounted on said frame, moving means for moving the work supporting means on said frame in the axial direction of the work, mechanism for moving the cutter support on said frame transverse of the work axis while the cutter produces a thread on the work and including means guiding said cutter support for movement transverse of the work axis, a straight-sided angle bar adapted to be adjustably positioned at different angles to the work axis and directly engaging said cutter support for relative sliding movement, and means connecting said bar to said work supporting means.

9. A thread cutting machine of the character described comprising a frame, work supporting means slidably mounted on said frame, means for rotating the work, a cutter, a cutter support mounted on said frame, moving means for moving the work supporting means on said frame in the direction of the work axis, mechanism for moving the cutter support on said frame transverse of the work axis while the cutter produces a thread on the work and including means guiding said cutter support for movement transverse of the work axis, a straight-sided angle bar adjustable to different angles to the work axis, a slide block pivotally carried directly by said cutter support and slidably engagable directly with said angle bar, and means for moving said angle bar parallel to the work axis in timed relation to the axial movement of the work.

10. In a thread cutting machine of the character described, a frame, a work supporting means slidably mounted on said frame, means for rotating the work, a cutter, a cutter support mounted on said frame, moving means for moving the work supporting means on said frame in the direction of the work axis, mechanism for moving the cutter support on said frame transverse of the work axis while the cutter produces a thread on the work comprising means guiding said cutter support for movement transverse of the work axis, an angle bar adjustable to different angles to the work axis, a slide bar having a pivotal connection to said angle bar, means on said work support supporting said slide bar for endwise movement therewith in a direction parallel to the work axis, and cooperating gaging surfaces at an end of said angle bar and at an end of said slide bar for gaging the distance therebetween to determine the angular setting of the angle bar.

11. In a thread cutting machine of the character described a head stock and a tail stock for rotatably supporting a work piece, a slide supporting said head stock and tail stock, a support on which said slide is guided for endwise movement, drive means for rotating the work piece, a carriage slidably mounted on said slide for movement in a direction transverse of the endwise direction of slide movement, gearing having connection to said drive means for operating said carriage on said slide, a bar adjustably mounted on said carriage for positioning at various angles to the direction of carriage movement on the slide, means slidably connected to said bar and having a pivotal connection to said support to move the carriage endwise in accordance with the angle setting of the bar, a grinding wheel, a grinding wheel support, and mechanism operated by said slide for moving the grinding wheel support transversely to the work axis while the grinding wheel produces a thread on the work.

12. In a thread cutting machine of the character described a head stock and a tail stock for rotatably supporting a work piece, a slide supporting said head stock and tail stock, a support on which said slide is guided for endwise movement, drive means for rotating the work piece, a carriage slidably mounted on said slide for movement in a direction transverse of the endwise direction of slide movement, gearing having connection to said drive means for operating said carriage on said slide, a bar adjustably mounted on said carriage for positioning at various angles to the direction of carriage movement on the slide, means slidably connected to said bar and having a pivotal connection on said support to move the carriage endwise in accordance with the angle setting of the bar, a grinding wheel, a grinding wheel support, and mechanism operated by said slide for moving the grinding wheel support transversely to the work axis while the grinding wheel produces a thread on the work and comprising an angularly adjustable bar movable parallel to the work axis, and means carried by the grinding wheel support and engageable with said bar and controlling the transverse movements of the grinding wheel support.

WILLIS FAY ALLER.
HARRY L. RAUSCH.